United States Patent [19]
Brinegar et al.

[11] Patent Number: 5,940,082
[45] Date of Patent: Aug. 17, 1999

[54] SYSTEM AND METHOD FOR DISTRIBUTED COLLABORATIVE DRAWING

[76] Inventors: David Brinegar, 1508 Oxford St., Berkeley, Calif. 94143-0450; David Hingston, 47 Eastwood Dr., San Francisco, Calif. 94112

[21] Appl. No.: 08/798,280

[22] Filed: Feb. 14, 1997

[51] Int. Cl.$^6$ .................................................... G06F 3/00
[52] U.S. Cl. ............................................................ 345/442
[58] Field of Search .................................. 345/440, 441, 345/442, 443

[56] References Cited

U.S. PATENT DOCUMENTS

| | | | |
|---|---|---|---|
| 5,206,934 | 4/1993 | Naef, III | 395/200 |
| 5,231,697 | 7/1993 | Yamada | 395/142 |
| 5,237,649 | 8/1993 | Yamada | 395/143 |
| 5,309,555 | 5/1994 | Akins et al. | 395/157 |
| 5,392,400 | 2/1995 | Berkowitz et al. | 395/200 |
| 5,425,109 | 6/1995 | Saga et al. | 382/187 |
| 5,442,788 | 8/1995 | Bier | 395/650 |
| 5,581,702 | 12/1996 | McArdle et al. | 395/200.04 |
| 5,608,872 | 3/1997 | Schwatz et al. | 395/200.04 |
| 5,717,879 | 2/1998 | Moran et al. | 395/339 |
| 5,726,669 | 3/1998 | Obata et al. | 345/2 |

OTHER PUBLICATIONS

Stults, "Experimental Uses of Video to Support Design Activities" (Palo Alto Research Center, Dec. 1988, copyright Xerox Corporation).

Tang, et al., "VideoDraw: A Video Interface for Collaborative Drawing" (System Sciences Laboratory, Palo Alto, California).

*Primary Examiner*—Phu K. Nguyen
*Assistant Examiner*—Cliff N. Vo
*Attorney, Agent, or Firm*—Gary S. Williams; Pennie & Edmonds LLP

[57] ABSTRACT

The present invention pertains to a system and method for managing a real-time distributed collaborative drawing activity. A community of collaborators associated with client computers are connected via a communications link with a server computer. Each collaborator contributes to the real-time design of a shared drawing that is displayed in each collaborator's virtual whiteboard. Contributions to the shared drawing as well as communications between the collaborators are transmitted to the server computer. The server computer broadcasts the communication to each of the collaborators engaged in the design activity. Each user has a set of drawing tools that are used to generate a variety of drawing strokes that edit the shared drawing. A curve generating procedure is used to capture the manner in which the user draws the stroke in order to emulate a selected drawing tool. A compact representation of the user's stroke is generated and transmitted to each collaborator.

27 Claims, 13 Drawing Sheets

SYSTEM AND METHOD FOR DISTRIBUTED COLLABORATIVE DRAWING

The present invention relates generally to distributed computing systems and particularly to a system and method for managing a distributed collaborative design activity.

BACKGROUND OF THE INVENTION

Interactive conferencing systems provide users residing in disparate geographic locations the capability to participate in a real time design activity. Typically each user or participant is associated with a computer that is networked with the computers of the other participants. A display device associated with each user is used as a virtual whiteboard to display and receive drawings and other communications pertinent to the collaborative design activity. Each participant has the same copy of the shared drawing in its whiteboard. Each participant engages in the design activity by adding or editing the shared drawing. Alterations to the shared drawing are quickly transmitted to each participant in order to maintain a consistent state of the shared drawing amongst the participants. Thus, the success of such a system relies on an efficient methodology for quickly relaying graphical images to each of the participants.

SUMMARY OF THE INVENTION

The technology of the present invention pertains to an apparatus and method for supporting a real-time computer-networked collaborative design activity. The collaborative design activity includes a community of users that communicate with one another through client computers interconnected via a computer network such as the Internet. In an embodiment of the present invention, the collaborative design activity is a shared drawing activity between a community of users within the architecture engineering construction (AEC) industry. Each user utilizes a video display as a virtual whiteboard to engage in the collaborative design of a shared drawing.

Each user or collaborator in the collaborative drawing session has its own copy of the shared drawing. Each user can edit the shared drawing. Each user's alterations are captured and transmitted to the server computer. The server computer then broadcasts the alterations to each of the client computers associated with a collaborator. Each collaborator receives the alterations which are then incorporated into their copy of the shared drawing.

Each collaborator is provided with a set of drawing tools that can be used to add or delete lines and curves to the shared drawing. Each drawing tool has associated with it a specific style. The present technology captures the manner in which a user draws a stroke in order to emulate the style of the drawing tool used to draw the stroke.

A collaborator uses a pointing device to draw a stroke. Location data points are used to represent the path of the stroke. The location data points are then used to generate curve points representing the curve in accordance with a specified resolution. The curve points are used to display an image of the curve. In addition, curve descriptors are generated which are a compact representation of the shape of the curve. The curve descriptors are transmitted to the server computer for broadcast to the other collaborators. A collaborator receiving the curve descriptors translates them into curve points in order to display the image in the collaborator's virtual whiteboard.

The speed and pressure at which portions of the stroke are drawn is used to emulate the natural style of the drawing tool used in drawing the stroke. Time data points and/or pressure data points can be received from a pointing device used to generate the user's stroke. The time and/or data points can be used to emulate the drawing tool's natural style. The natural style of a drawing tool can be manifested in the varying color hues, texture, and thickness of the stroke.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

System Architecture

Figure 1:
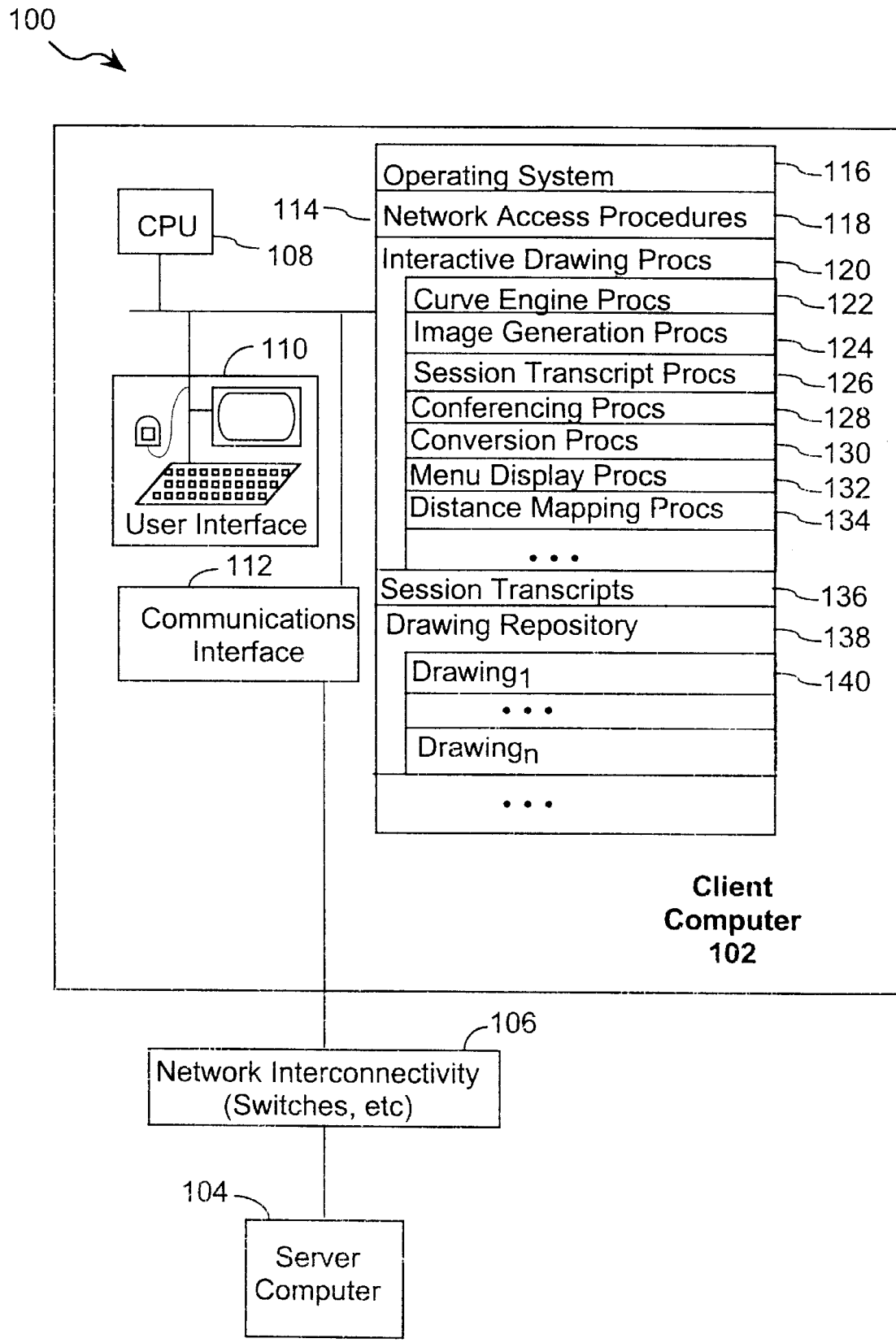
FIG. 1 is a block diagram of a computer system incorporating the preferred embodiments of the present invention.

The technology of the present invention pertains to an apparatus and method for supporting a real-time computer-networked collaborative design activity. The collaborative design activity includes a community of users that communicate with one another through client computers interconnected via a public computer network such as the Internet. The communications between each participant includes all media forms that can be transmitted via a computer network. Examples of such media can include, but are not limited to, text, video, sound, and/or graphical images. A server computer is used to coordinate the transmission of the communications between each participant.

In an embodiment of the present invention, the collaborative design activity is a shared drawing activity between a community of users within the architecture engineering construction (AEC) industry. Each user utilizes a video display as a shared drawing space that can display one or more drawings. These drawings can include computer-aided design (CAD) drawings, construction blueprints, architectural drawings, computer-designed graphic images, and the like.

Each user or collaborator in the collaborative drawing session has its own copy of the shared drawing. Each user can edit the drawing using one or more graphic devices, such as but not limited to, a mouse or other pen pointing device. A collaborator can edit the shared drawing by adding a new drawing to it, change a part of the existing shared drawing, or perform other edit changes. The alterations to the drawing by each user are then captured and transmitted to the server computer. The server computer then broadcasts the alterations to each of the client computers associated with a collaborator. Each collaborator receives the alterations and incorporates them in their copy of the shared drawing.

In addition, each collaborator can send text messages to other collaborators. A dialogue or chat box is provided which allows real-time text-based messages to be communicated between one or more collaborators during the shared drawing session. In other embodiments of the present invention, messages including video and audio data can also be transmitted between the collaborators.

Referring to FIG. 1, a system 100 representing a preferred embodiment of the present invention includes a number of client computers 102 and one or more server computers 104 in communication via a communications link 106. The communication link 106 generically refers to any type of wire or wireless link between computers, such as but not limited to a local area network, a wide area network, or a combination of networks. In a preferred embodiment of the present invention, the communications link 106 can be a network such as the Internet.

A client computer 102 includes a central processing unit (CPU) 108, a user interface 110, a memory 114, and a communications interface 112. The client computer 102 can be any type of computing device, such as but not limited to, desktop computers, workstations, laptops, and/or mainframe computers. One or more users (not shown) can be associated with each client computer 102. The communications interface 112 is used to communicate with other client computers 102 as well as other system resources not relevant here.

The user interface 110 can consist of any type and number of input/output (I/O) devices, such as but not limited to, a video display device, printing devices, a keyboard, a mouse, pen pointing devices, graphic tablets (such as a WACOM pressure sensitive graphics tablet), and the like.

The memory 114 of the client computer 102 may be implemented as RAM (random access memory) or a combination of RAM and non-volatile memory such as magnetic disk storage. The memory 114 of the client computer 102 can contain the following:

an operating system 116;
network access procedures 118. In an embodiment of the present invention, the network access procedures 118 can be used to implement a communications protocol that is suitable for transmitting data through the Internet, such as the Transmission Control Protocol and the Internet Protocol (TCP/IP);
an interactive drawing procedure 120 that manages the collaborative design activities between several client computers 102;
one or more session transcripts 136. Each session transcript 136 stores a transcription of the events that occur during a collaborative design activity. A particular session transcript 136 can be replayed at a later point in time;
a drawing repository 138 that stores one or more drawings 140. A drawing 140 can be stored in any computer-generated image or graphic file format, such as but not limited to BMP, DXF, HPGL, DIB, TGA, GIF, TIF, PCX, JPG, and the like; and
other procedures and data structures.

The interactive drawing procedure 120 can contain the following:

one or more curve engine procedures 122. Each curve engine procedure 122 is used to generate the curve descriptors and curve data points used to represent a curve;
image generation procedure 124 that display images onto any type of I/O device, such as a video display device;
session transcript procedures 126 that record portions of or the entire design activity session into a session transcript 136. In addition, the session transcript procedures 126 enable a user to replay a particular session transcript 136 at a later point in time;
conferencing procedures 128 that manage the exchange of communications between each collaborator during a design activity session;
conversion procedures 130 that convert an incoming drawing stored in a particular file format into a format suitable for use by the interactive drawing procedure 120;
menu display procedures 132 that manage the drawing facilities provided to a user; and
distance mapping procedures 134 that map a time and/or pressure value into an equivalent measure of distance;
as well as other procedures and data structures.

Figure 2:
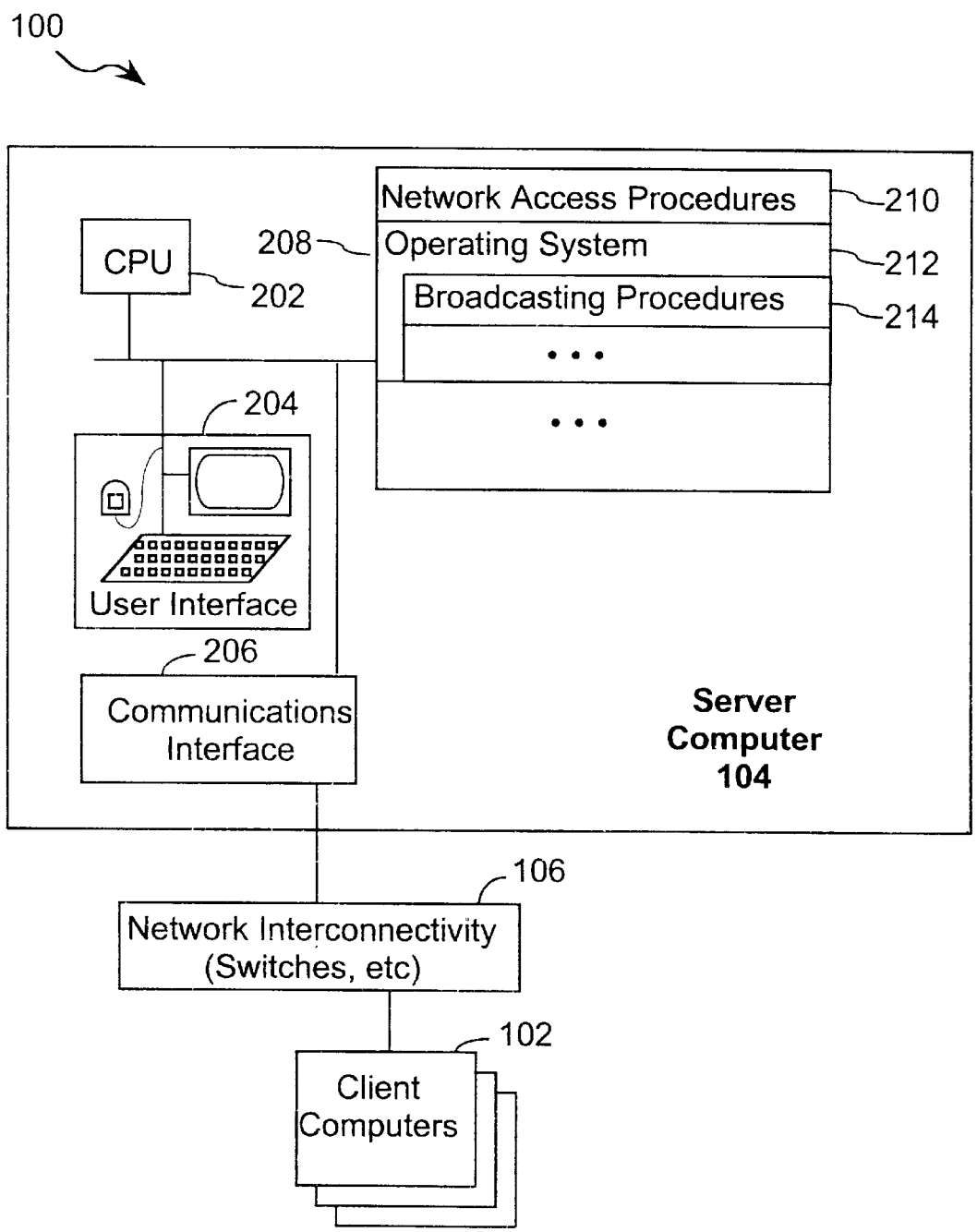
FIG. 2 shows a server computer system according to an embodiment of the present invention.

Referring to FIG. 2, there is shown a server computer 104 including a central processing unit (CPU) 202, a user interface 204, a memory 208, and a communications interface 206. The memory 208 of the server computer 104 can contain the following:

network access procedures 210. In an embodiment of the present invention, the network access procedures 210 can be used to implement a communications protocol that is suitable for transmitting data through the Internet, such as the Transmission Control Protocol and the Internet Protocol (TCP/IP);
an operating system 212; and
other procedures and data structures.

The operating system 212 of the server computer 104 utilizes broadcasting procedures 214 that manage the conferencing activities between the various client computers 102 engaged in the collaborative design activity. In an embodiment of the present technology, the UNIX operating system is used which supports a multi-user backbone (M-bone) or network ability that allows multiple client computers 102 to connect to a particular server computer 104. However, it should be noted that the present invention is not limited to this particular type of operating system or broadcasting facility. Others can be used so long as they provide the same functionality.

The server's operating system procedures 212 utilizes a network port to support a number of communication streams that are used to transmit data between the client computers 102 engaged in the collaborative design activity. The server's operating system 212 receives transmissions from one or more client computers 102 and routes them to the intended client computers 102. Initially, a client computer 102 sends a request to the server computer 104 to connect. The request contains the Internet address of each client computer 102 of a collaborator. The server computer 104 makes the connection and establishes a stream representing a connection between the client computer 102 with its network port. This stream allows communications to be transmitted rather rapidly between the server computer 104 and the particular client computer 102.

Figure 3:
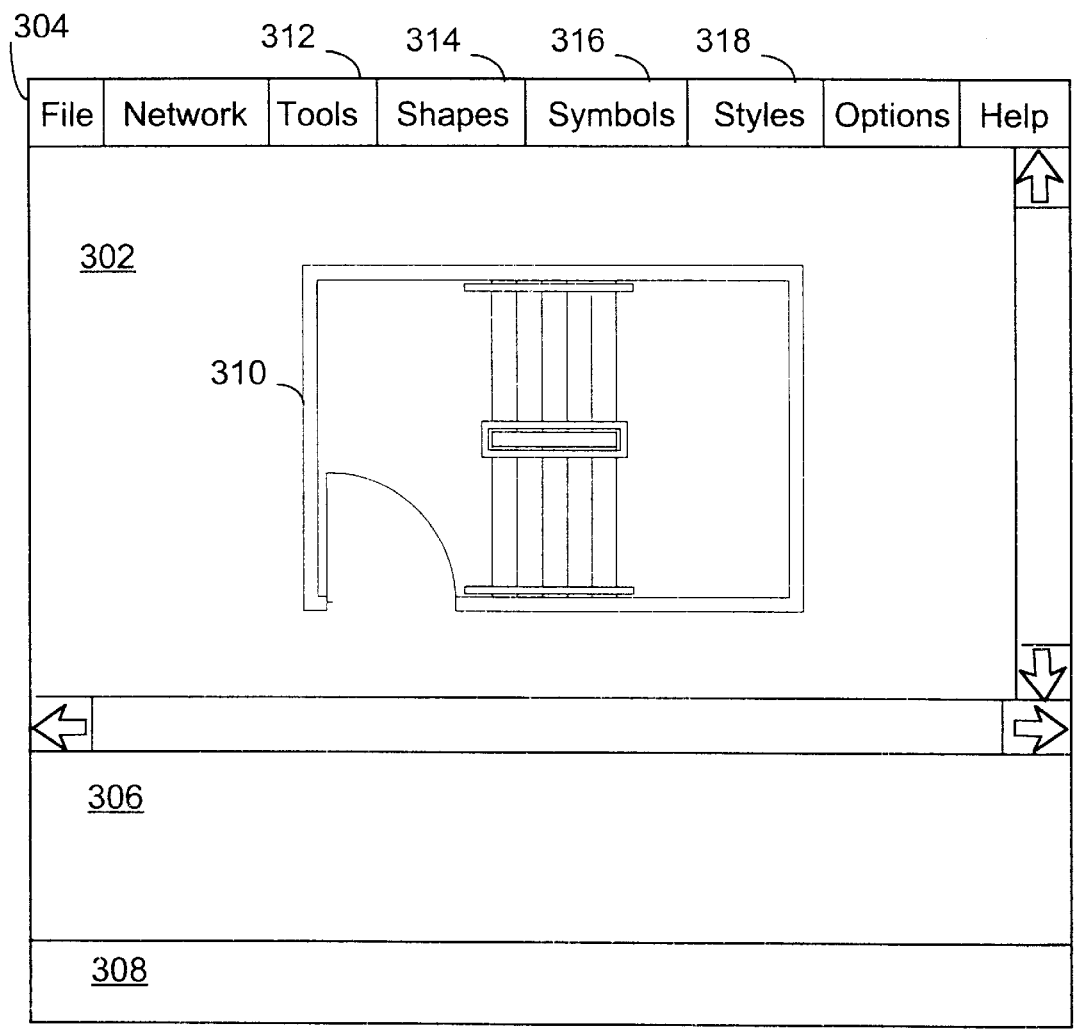
FIG. 3 is a schematic representation of an exemplary video display screen used in an embodiment of the present invention.
Figure 4A:
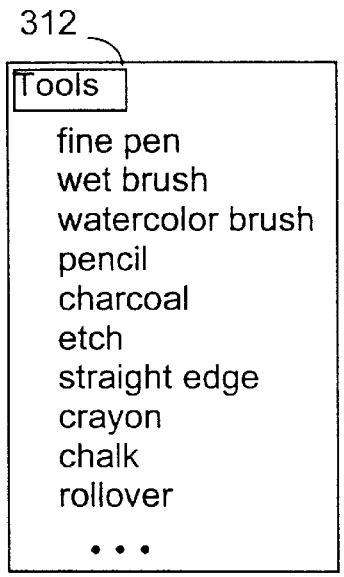
FIGS. 4A–4D are schematic representations of menu selection items used in an embodiment of the present invention.
Figure 4B:
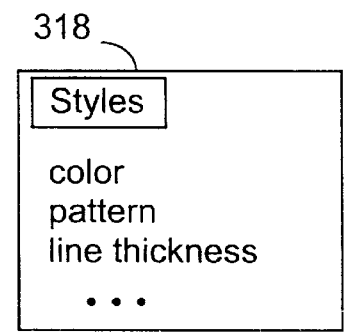
Figure 4C:
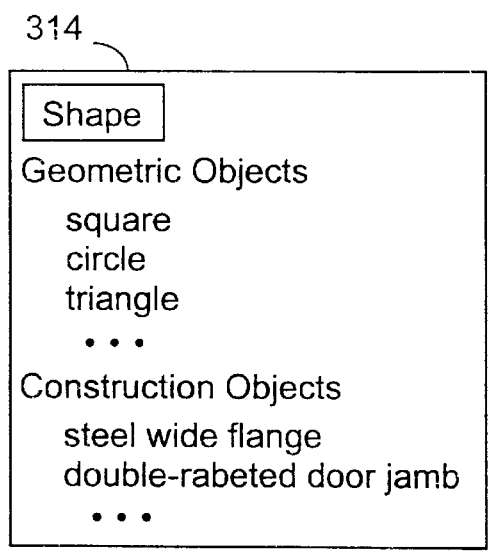
Figure 4D:
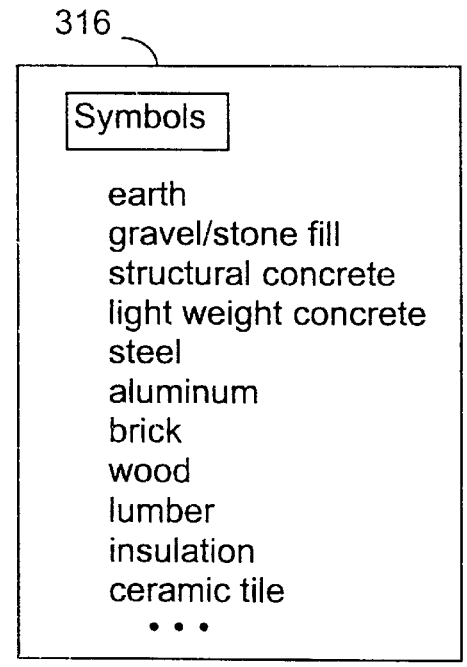

Each collaborator participates in a collaborative drawing activity by utilizing the video display as a "virtual" whiteboard. The whiteboard can display any and all graphic images that are part of the collaborative drawing activity. FIG. 3 illustrates an exemplary screen display in accordance with an embodiment of the present invention. The interactive drawing procedure 120 displays the virtual whiteboard 302 along with a menu bar 304, a dialogue box 306, and a text input box 308. The virtual whiteboard 302 can consist of one window illustrating a particular drawing 310, can include multiple windows (not shown) with each window focusing on a particular aspect of the drawing 310, or multiple windows (not shown) with each window displaying a different drawing. The dialogue box 306 is used to display text messages that are transmitted and received during a collaborative drawing session. The text input box 308 is used by a user to insert text messages that are distributed via the server computer 104 to the other collaborators of the collaborative drawing session.

Each collaborator can utilize a different type of video display device. For this reason, each collaborator's whiteboard is presumed to be of a standard size and is scaled, if necessary, to accommodate the dimensions of a particular collaborator's video display device.

Each collaborator can edit the drawing in a variety of ways using different tools 312 to draw different objects, lines, strokes, shapes, and the like. A menu display procedure 132 provides a number of facilities that enable the user to edit a drawing in an intended manner. FIGS. 4A–4D illustrate an exemplary list of such facilities. For instance, the user can select a particular drawing tool 312 from a menu that includes, but is not limited to, the following tools: a fine pen, a wet brush, a watercolor brush, a pencil, a charcoal pen, an etch device, a straight edge, a crayon, a piece of chalk and/or a rollover. A user can use a particular tool to draw a stroke or text in its whiteboard. In addition, one or more templates of predefined shapes 314 or objects is provided for the user. The style of each stroke, shape, or text can be associated with one or more styles 318 and/or textures 316. The textures 316 can represent various fill patterns. In an embodiment of the present invention, the textures 316 can represent materials used in the AEC industry. For instance, a diagonal cross-hatch texture can represent concrete, a orthogonal cross-hatch texture can represent ceramic title, and so forth.

The general architecture and processing associated with the interactive collaborative design activity has now been disclosed. Attention presently turns to the curve generating techniques associated with the present technology.

Curve Generating Method

In the collaborative drawing session of the present invention, each user can edit the shared drawing. Typically, a user edits the drawing by adding or deleting strokes to the shared drawing. A pointing device is used to trace the path of the user's stroke. The pointing device represents the path as a number of position data points. The position data points are then mapped into curve descriptors which are a concise representation of the Bezier curves that form the stroke. In addition, the stroke is also represented by a number of curve points that are used by the image generation procedure to display the stroke. The curve descriptors are transmitted to the server computer and broadcasted to the other collaborators.

In some instances, time and pressure data points are received along with the position data points. The time data points reflect the speed at which the stroke was generated and the pressure data points reflect the pressure used to generate the stroke. The time and pressure points are used to capture the natural style of the drawing tool used to draw the stroke. The natural style of a drawing tool is manifested by the varying color hues in the stroke, by the width of the stroke, and by the texture of stroke. For instance, segments of a stroke drawn fast are represented by a darker hue or texture than segments that are drawn slower. In addition, segments of a stroke that are drawn fast are often thinner than those drawn slowly. Likewise, the pressure of a stroke can affect the color hue, texture, and width characteristics. For example, segments of a stroke that are generated with heavy pressure can be reflected with a darker hue, darker texture and with a wider shape. By contrast, a lightly drawn stroke can be reflected with a lighter hue, lighter texture and with a thinner shape.

The characteristics of each drawing tool varies. As such, the time and pressure data points are used differently to reflect the natural style of a particular drawing tool. For example, pressure has an effect on the stroke that is generated by a water color brush but speed may not. The pressure used to draw a stroke with a water color brush will affect the width of the stroke but not the hue. By contrast, pressure and speed affect the style of a wet paint brush stroke. The more pressure that is used to draw the stroke, the thicker and darker the stroke becomes. Similarly, the faster the stroke is drawn, the thicker and darker the stroke becomes.

The curve generating method of the present technology traces the path of a user's stroke and generates a curve from it. The curve is represented as a set of curve points and as a set of curve descriptors. The curve points are used to display the image in accordance with user-defined directives. The user-defined directives can specify the curve's resolution and the curve characteristics relative to a particular drawing tool.

The curve descriptors define the shape of the curve. Three curve descriptors are used to represent a curve: a first descriptor represents a starting point of the curve; a second descriptor represents the shape of the curve; and a third descriptor represents an ending point of the curve. The curve descriptors are transmitted to the collaborators of a collaborative drawing session. The curve descriptors are transmitted rather than the position data points in order to minimize the amount of data that is transmitted between the collaborators. In this manner, the speed of the transmission is increased and relatively low bandwidth transmission links can be utilized without compromising the speed at which drawing updates are broadcast.

The curve generating method of the present technology differs from curve fitting techniques. Curve fitting techniques "fit" or generate a curve from a set of user-defined control points that describe the shape of the curve. The control points are not necessarily part of the curve. By contrast, the present technology receives a curve and translates it into another curve in accordance with one or more user-defined directives (i.e., resolution value and drawing tool).

Prior to discussing the details of the curve generating methods, a brief synopsis of the method is described first followed by a glossary of terms used in this document concerning the curve generating method. The curve generating method utilizes Bezier curve methods which are well-known in the art. A more detailed description of the Bezier curve methods can be found in Newman and Sproull, *Principles of Interactive Computer Graphics,* 2d edition, McGraw-Hill Book Company, which is hereby incorporated by reference as background information.

The curve generating method maps position data points received from a pointing device into a set of curve data points that define one or more Bezier curves. The curve engine 122 performs this mapping in real time and is sensitive to real-time processing constraints.

A stroke is represented as a series of second degree Bezier curves. Each Bezier curve is represented by a mathematical function q(u). The function q(u) is defined over a sat of evenly-distributed intervals represented by the vector u. Each interval $u_j$ is a real number within the range between 0 to 1. The number of intervals, n, effects the resolution of the curve. The number of intervals can be either a user-defined value or determined from the curve engine 122. In order to process the position data points in real time, the curve engine 122 may adjust the number of intervals in order to meet the demands of real-time processing.

Time and pressure data points can also be received from the pointing device. These data points are also transformed into a series of second degree Bezier curves in accordance with the same mathematical function q(u). The time and pressure Bezier curves are used by the image generation procedure 124 to generate an intended image of the curve.

To assist the reader, the following glossary of terms is used to describe the curve generating method:

Position data point: An (x, y) integer pair representing the logical location of the device pointer relative to the upper left hand corner of the video display device.

Time data point: An integer value within the range [0, 65535] that represents a time unit at which a corresponding position data point is generated. In an embodiment of the present invention, the time unit is expressed in milliseconds and represents the time differential from the immediately previous point.

Pressure data point: An integer value within the range [0,255] that represents the pressure associated with a corresponding position data point. In an embodiment of the present technology, 0 represents no pressure and 255 represents the heaviest amount of pressure.

Curve segment: A second degree Bezier curve, $q_1(u)$, that is represented by a vector, u, of location curve points, $u_j$, that are defined via the mathematical relation:

$$q_1(u_j) = \sum_{i=0}^{d} V_1(i) B_{d,i}(u_j) \quad (1)$$

where d=2, $u_j$ represents a relative location along the curve. The values of u are real numbers $u_n$ such that $0 \leq u_n \leq 1$, where n controls the resolution of the curve, $B_{d,i} = u_j^i (1-u_j)^{d-i}$, and $V_1(i)$ are location curve descriptors. $V_1(0)$ represents a starting point of the curve segment, $V_1(2)$ represents an ending point of the curve segment, $V_1(1)$ represents a shape descriptor represented in accordance with the following mathematical relation:

$$V_1(1) = \frac{q_1(u_k) - V_1(0) B_{2,0}(u_k) - V_1(2) B_{2,2}(u_k)}{B_{2,1}(u_k)} \quad (2)$$

where $u_k$ is the interval that represents the furthest distance from the starting and ending points and can be determined via the following mathematical relation:

$$\max_{0 < i < n} \{|x_0, y_0 - x_i, y_i| + |x_i, y_i - x_n, y_n|\} \quad (3)$$

where $x_0, y_0$ is the starting point of the curve segment, $x_n, y_n$ is the ending point of the curve segment, and $x_i, y_i$ are all other location curve points in the curve segment.

Stroke: The curve drawn by a user. A stroke is represented by a series of curve segments $q_{1,1}(u), q_{1,2}(u), \ldots, q_{1,n}(u)$.

Location curve descriptors: Control points that define a curve segment and are defined above.

Time curve: A series of time segments representing a time dimension associated with the user drawn stroke.

Time segment: A second degree Bezier curve, $q_2(u)$, that is represented by a vector, u, of time curve points, $u_j$, that are defined via the mathematical relation:

$$q_2(u_j) = \sum_{i=0}^{d} V_2(i) B_{d,i}(u_j) \quad (4)$$

where d=2, $u_j$ represents a relative location along the curve. The values of u are real numbers $u_n$ such that $0 \leq u_n \leq 1$, where n controls the resolution of the curve, $B_{d,i} = u_j^i (1-u_j)^{d-i}$, and $V_2(i)$ are time curve descriptors. $V_2(0)$ represents a starting time point, $V_2(2)$ represents an ending time point, $V_2(1)$ represents a shape descriptor represented in accordance with the following mathematical relation:

$$V_2(1) = \frac{q_2(u_k) - V_2(0) B_{2,0}(u_k) - V_2(2) B_{2,2}(u_k)}{B_{2,1}(u_k)} \quad (5)$$

where $u_k$ is the interval that represents the furthest distance from the starting and ending points and can be determined via the following mathematical relation:

$$\max_{0 < i < n} \{|x_0, y_0 - x_i, y_i| + |x_i, y_i - x_n, y_n|\} \quad (6)$$

where $x_0, y_0$ is the starting time point, $x_n, y_n$ is the ending time point, and $x_i, y_i$ are all other time curve points in the curve segment.

Pressure curve: A series of pressure segments representing a pressure dimension associated with the user drawn stroke.

Pressure segment: A second degree Bezier curve, $q_3(u)$, that is represented by a vector, u, of pressure curve points, $u_j$, that are defined via the mathematical relation:

$$q_3(u_j) = \sum_{i=0}^{d} V_3(i) B_{d,i}(u_j) \quad (7)$$

where d=2, $u_j$ represents a relative location along the curve. The values of u are real numbers $u_n$ such that $0 \leq u_n \leq 1$, where n controls the resolution of the curve, $B_{d,i} = u_j^i(1-u_j)^{d-i}$, and $V_3(i)$ are pressure curve descriptors. $V_3(0)$ represents a starting pressure curve point, $V_3(2)$ represents an ending pressure curve point, $V_3(1)$ represents a shape descriptor represented in accordance with the following mathematical relation:

$$V_3(1) = \frac{q_3(u_k) - V_3(0)B_{2,0}(u_k) - V_3(2)B_{2,2}(u_k)}{B_{2,1}(u_k)} \quad (8)$$

where $u_k$ is the interval that represents the furthest distance from the starting and ending points and can be determined via the following mathematical relation:

$$\max_{0<i<n}\{|x_0,y_0-x_i,y_i|+|x_i,y_i-x_n,y_n|\} \quad (9)$$

where $x_0,y_0$ is the starting pressure curve point, $x_n,y_n$ is the ending pressure curve point, and $x_i,y_i$ are all other pressure curve points in the curve segment.

Figure 5:
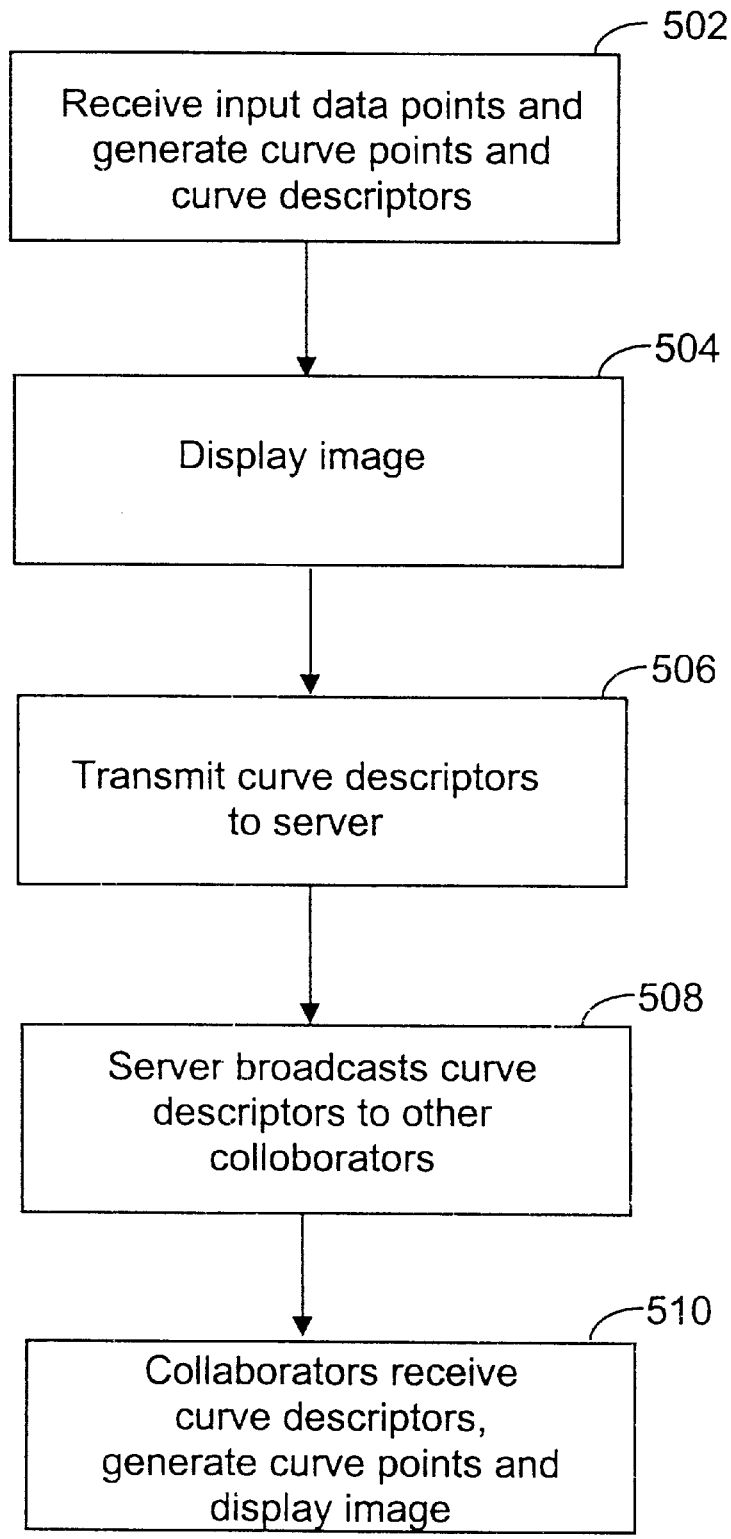
FIG. 5 is a flow chart of the steps used to capture and transmit drawing alterations made during a collaborative design activity.

FIG. 5 illustrates the steps used in the curve generating method of an embodiment of the present invention. During a collaborative drawing session, a collaborator can draw a stroke utilizing a pointing device. The pointing device represents the locations pointed to by the user as a set of position data points. The position data points are integer value pairs (x,y) that represent the logical location of the device pointer relative to the upper left hand corner of the video device. The curve generation procedure 122 receives the position data points in real-time and simultaneously generates curve points and curve descriptors (step 502). The details of the generation of the curve points and curve descriptors will be discussed below.

The curve points are then used by the image generation procedure 124 to display the curve on the user's video display device or other I/O device (step 504). The curve descriptors are formatted and transmitted to the server computer 104 for broadcast to other collaborators (step 506). The server computer 104 receives this data and broadcasts it to the intended collaborators (step 508). A collaborator receives the transmission, generates the appropriate curve points that correspond to the curve descriptors, and displays the new image (step 510).

FIGS. 6A–6E illustrate the curve generating method. The user's stroke is represented by a series of position data points that are represented as x,y integer pairs. The position data points are partitioned into curve segments and a Bezier curve is defined for each curve segment. The Bezier curve consists of a number of curve points which are used to display the resulting image. The number of curve points is a function of the curve's resolution. Coarsely drawn curves are represented by a smaller number of curve points than smoothly drawn curves.

Figure 6A:
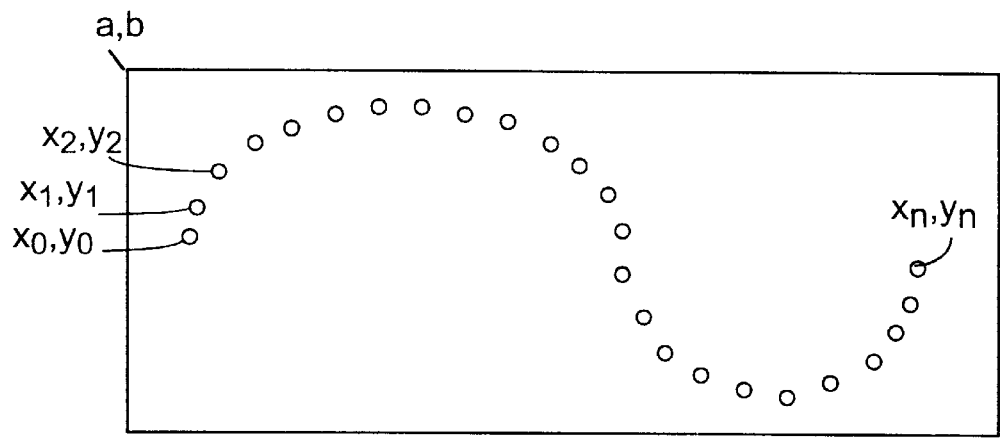
FIGS. 6A–6E are schematic representations of the steps used to trace the path of a curve drawn in a shared drawing.
Figure 6B:
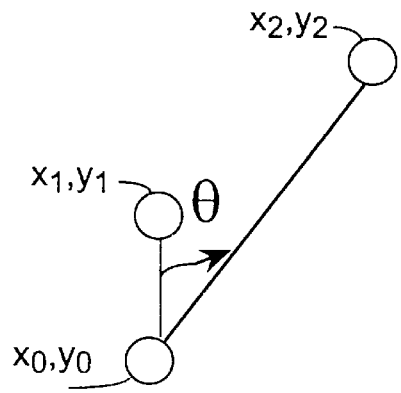
Figure 6C:
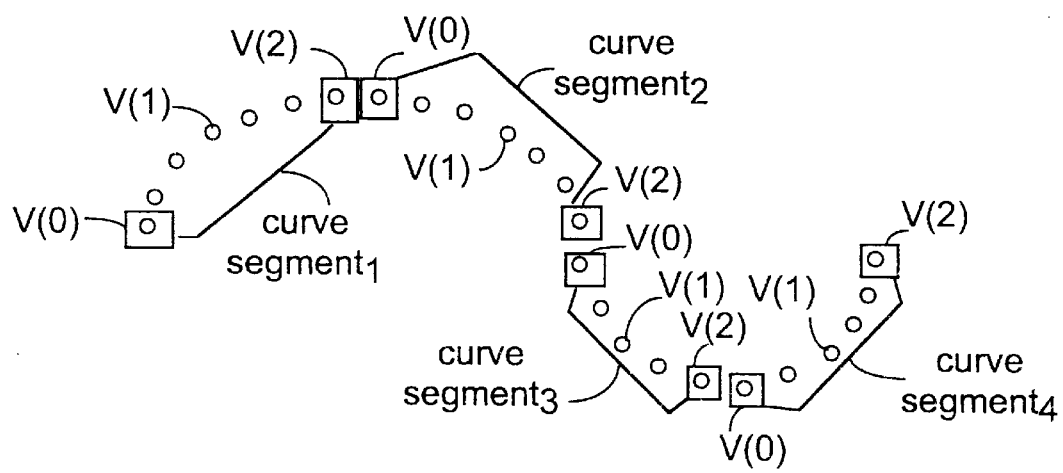

Referring to FIG. 6A, each integer pair (x,y) is received in real time by the curve engine 122. The first point $(x_0,y_0)$ is denoted as the starting curve point of the first curve segment. The starting point is also the first curve descriptor V(0). Each subsequent point is analyzed to determine whether it is part of the first curve segment. Referring to FIGS. 6B–6C, this is doe by determining the angle, θ, between the starting point, $(x_0,y_0)$, and the previous data point $(x_1,y_1)$ and the starting point, $(x_0,y_0)$, and the current data point $(x_2,y_2)$. If the angle θ exceeds a predetermined threshold, the previous data point $(x_1,y_1)$ is made the ending point V(2) of one curve segment and the starting point V(0) of a new curve segment. The ending point V(2) is also a curve descriptor. In addition, a new curve segment is formed when the direction of the angle θ is opposite of the direction of the previously-calculated angle.

A third curve descriptor V(1) is generated to represent the shape or peak of the curve segment in accordance with equation (2) above. FIG. 6C illustrates the various curve segments formed from a user's stroke and their respective curve descriptors. The curve descriptors for each curve segment of a user's stroke is transmitted to the collaborators engaged in the drawing activity.

Figure 6D:
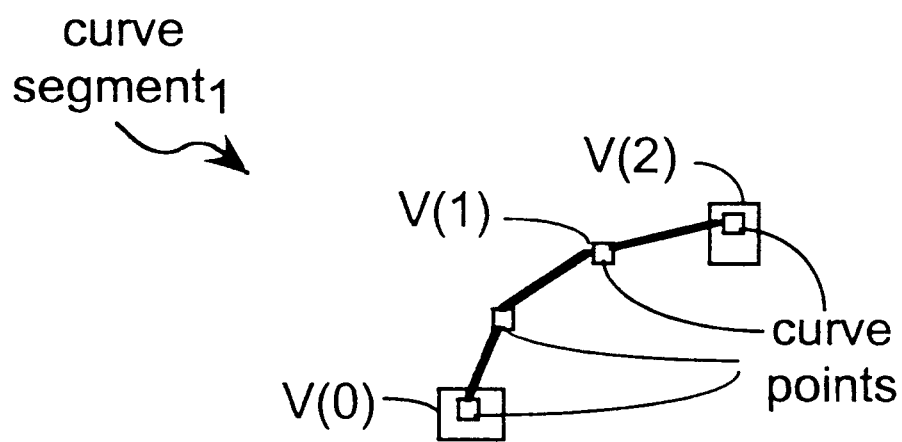
Figure 6E:
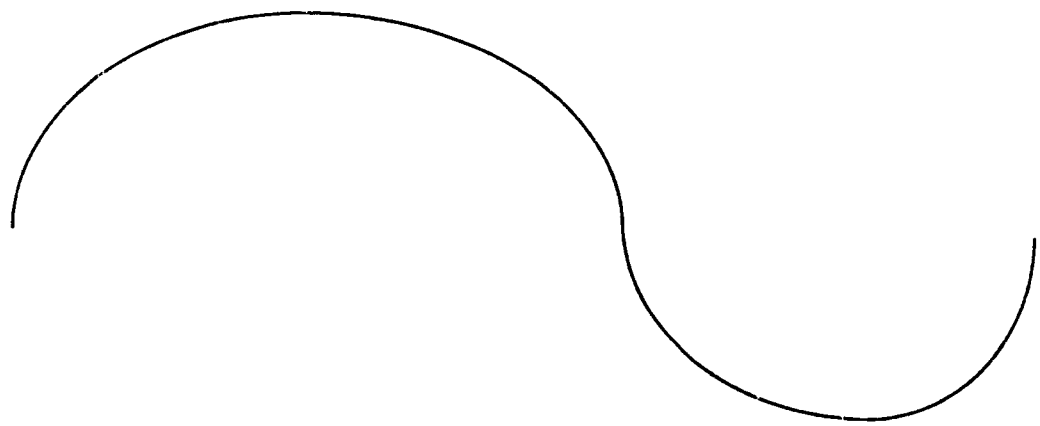

A Bezier curve is formulated for each defined curve segment. The Bezier curve is represented as a series of curve points. A curve segment is displayed as a series of lines that connect the curve points as shown in FIG. 6D. Thus, the number of curve points determines the resolution of the curve. The curve points are transmitted to the image generation procedure 124 which displays the resulting curve as illustrated in FIG. 6E.

In addition, time and pressure data points can be received from the pointing device along with the position data points. A time data point can be an integer pair representing a time value and an index. The time value can be within the range [0, 65535] and is expressed in milliseconds. The index represents the order of a time data point relative to other time data points. The time data points are mapped into a set of time curve points and time curve descriptors. The time curve points are used along with the location data points to display the image in accordance with the natural style of a particular drawing tool. The time curve descriptors are transmitted to other collaborators along with the location curve descriptors and/or pressure curve descriptors in order to display the curve in the collaborator's whiteboard.

Similarly, a pressure data point can be an integer pair representing a pressure value and an index. The pressure data point value can be within the range [0, 255]. The index represents the order of a pressure point relative to other pressure points. The pressure data point is mapped into a set of pressure curve points and pressure curve descriptors. The pressure curve points are used along with the location curve points and/or time curve points to display the image in accordance with the natural style of a particular drawing tool. The pressure curve descriptors are transmitted to other collaborators along with the location and/or time curve descriptors in order to display the curve in the collaborator's whiteboard.

Figure 7:
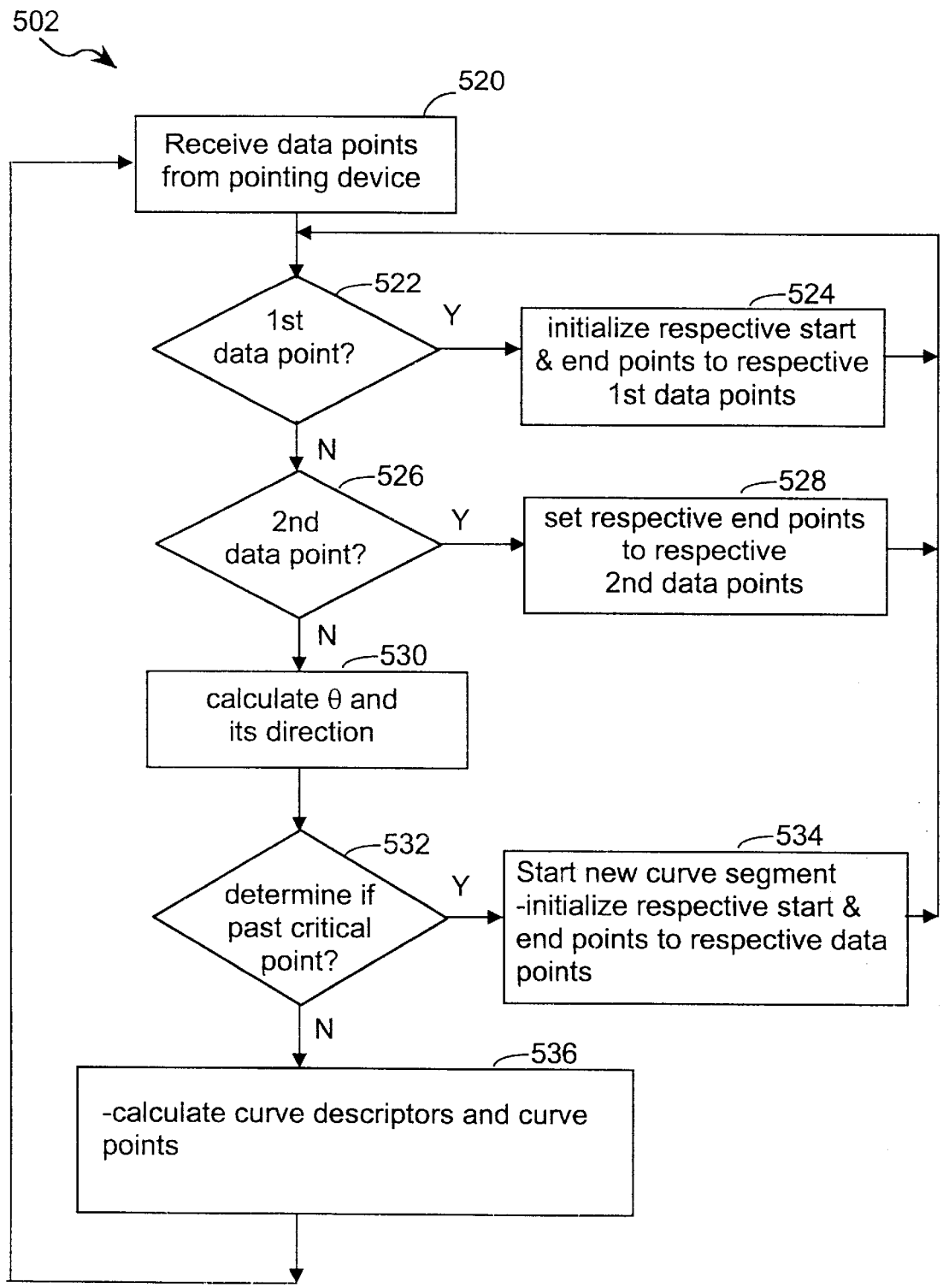
FIG. 7 is a flow chart of the steps used to draw a curve in a shared drawing.

FIG. 7 illustrates the steps used in generating a curve in an embodiment of the present technology. It should be noted that a user's stroke can include lines as well as curves and that the curve generation engine 122 can accommodate lines as well as curves. The following discussion focuses on curves and can be easily modified by one skilled in the art to accommodate lines.

Further, the following discussion pertains to an embodiment where the pointing device retrieves location, time, and pressure data points from a user's stroke. In alternate embodiments, the pointing device would retrieve any combination of location data points and either time or pressure data points. One skilled in the art would be able to easily modify the discussed methodology to accommodate these alternate embodiments. In yet another embodiment, the time data points need not be extracted from the pointing device. The time data points can be calculated by the curve generation engine 122 using the location data points. This can be performed by calculating the distance between two successive location data points and mapping the distance into an appropriate time unit. In addition, other methodologies can be used to calculate time data points from the location data points.

Referring to FIG. 7, the curve engine 122 receives in real time a number of data points (step 520) represented as follows:

$I_i$: location data point represented as (x,y).

$t_i$: time data point represented as $(z_1, z_2)$ where $z_1$ is an integer value within the range [0,65535] and a time unit expressed in milliseconds and where $z_2$ represents the index of the time data point relative to other time data points.

$p_i$: pressure data point represented as $(p_1, p_2)$ where $p_1$ is an integer value within the range [0, 255] and where $p_2$ represents the index of the pressure date point relative to other pressure data points.

$V_{1,j}(0)$, $V_{1,j}(1)$, $V_{1,i}(2)$: curve descriptors for curve segment j.

$V_{2,j}(0)$, $V_{2,j}(1)$, $V_{2,j}(2)$: curve descriptors for time curve segment j.

$V_{3,j}(0)$, $V_{3,j}(1)$, $V_{3,j}(2)$: curve descriptors for pressure curve segment j.

The curve engine procedure 122 determines if the received data points are the first set of data points (step 522). In this case (step 522-Y), the start and end curve descriptors V(0) and V(2) for each data point type is initialized as follows (step 524):

$$V_{1,j}(0)=V_{1,j}(2)=I_i;\ V_{2,j}(0)=V_{2,j}(2)=t_i;\ V_{3,j}(0)=V_{3,j}(2)=p_i. \quad (10)$$

If the received data points are the second set of data points (step 526), the end curve descriptors are set to the respective second data point as follows (step 528):

$$V_{1,j}(2)=I_i;\ V_{2,j}(2)=t_i;\ V_{3,j}(2)=p_i. \quad (11)$$

For each subsequent set of data points, the direction of the curve and its growth is determined relative to the starting point or first curve descriptor (step 530). This is performed by determining the angle between two secant lines representing the previous location data point and the current location data point (see FIG. 6B). This can be determined mathematically as follows:

$$\theta=\arctan\ ((|y_1-y_0|-|y_2-y_0|)-(|x_1-x_0|-|x_2-x_0|)) \quad (12)$$

In addition the direction of the angle $\theta$ is determined and compared with the direction of the immediately preceding calculated angle. The direction of the angle $\theta$ is expressed as being either a clockwise direction or as a counter clockwise direction.

The computed angle $\theta$ and its direction is used to determine if the received location data point is past a critical point defining the current curve segment (step 532). This is determined by testing the computed angle $\theta$ against a user-defined threshold. In an embodiment of the present technology this threshold is between the range $(\pi/4, \pi/10)$. If the direction of the angle is opposite to the previously calculated angle, this will indicate that the received location data point is outside the realm of the current curve segment.

If it is determined that the received data points define a new curve segment (step 532-Y), the curve descriptors V(0) and V(2) are initialized to the respective data points as follows (step 534):

$$V_{1,j+1}(2)=I_i;\ V_{2,j+1}(2)=t_i;\ V_{3,j+1}(2)=p_i.$$

$$V_{1,j+1}(0)=I_{i-1};\ V_{2,j+1}(0)=t_{i-1};\ V_{3,j+1}(0)=p_{i-1}. \quad (13)$$

Otherwise (step 532-N), the appropriate curve descriptors and curve points are calculated (step 536). The $V_1(1)$, $V_2(1)$, $V_3(1)$ curve descriptors are calculated as described in equations (2), (5), and (8) and the curve points $q_1(u)$, $q_2(u)$, and $q_3(u)$ are calculated as well as described in equations (1), (4), and (7).

Steps 520–536 are repeated until no more data points are received by the curve engine procedure 122 from the pointing device. This typically signifies the fact that the user has completed the stroke by removing the pointing device from the visual display device.

Referring to FIG. 5, upon the completion of the above mentioned curve generating method, the curve descriptors are transmitted to the server computer for broadcast to the other collaborators (step 506). The transmission can be formatted to include the following: drawing tool indicator, location curve descriptors, time curve descriptors, and pressure curve descriptors. The drawing tool indicator specifies the particular drawing tool used to make the stroke.

When a collaborator receives the curve descriptors, the curve engine 122 transforms the curve descriptors into a respective set of curve points in accordance with equations (1), (4), and (7). The curve points are then transmitted to the image generation procedure 124 which displays the curve in the collaborator's whiteboard.

Image Generating Method

Figure 8:
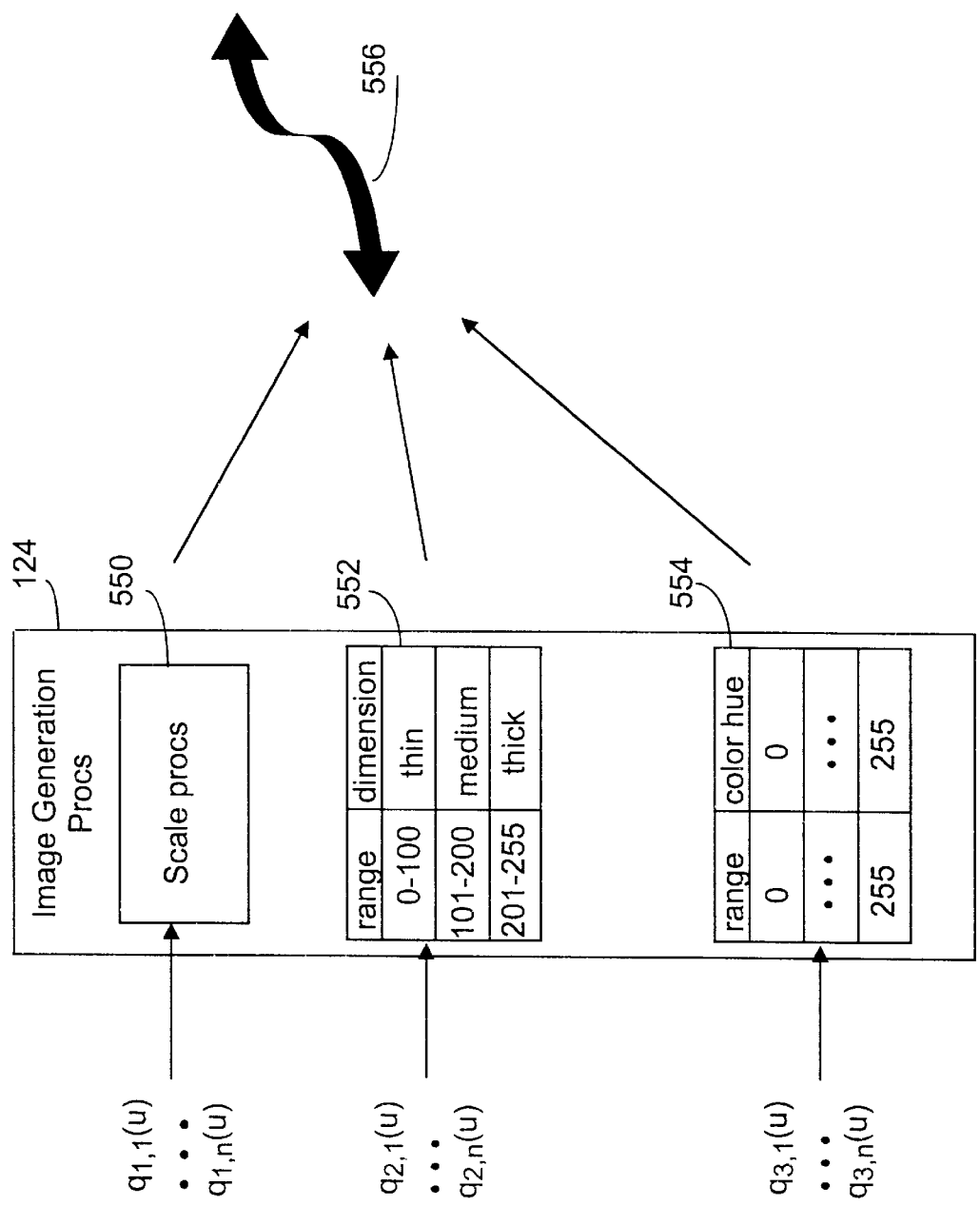
FIG. 8 illustrates the steps used by the image generation procedure in displaying an image.

Referring to FIG. 8, the image generation procedure 124 can receive three sets of curve points: a set of location curve points $q_{1,1}(u) \ldots q_{1,n}(u)$; a set of time curve points $q_{2,1}(u) \ldots q_{2,n}(u)$; and a set of pressure curve points $q_{3,1}(u) \ldots q_{3,n}(u)$ which it uses to display the associated image 556. The image generation procedure 124 can utilize a scale procedure 550 to map the location curve points $q_{1,1}(u) \ldots q_{1,n}(u)$ into suitable coordinates for the particular collaborator's visual display device. In addition, each drawing tool has associated with it one or more scale tables 552, 554 that are used to map the time curve points $q_{2,1}(u) \ldots q_{2,n}(u)$ and pressure curve points $q_{3,1}(u) \ldots q_{3,n}(u)$ into suitable color and dimension attributes associated with the video display device.

The general curve and image generating methods associated with the collaborative design activity have now been disclosed. The present technology provides two additional capabilities that will now be discussed. Specifically the capability for erasing a displayed curve and the capability of automatically generating parallel lines from a single user's stroke.

Erasure

During a collaborative drawing session, a user can erase any lines or curves in the shared drawing. For illustration purposes, the situation where a user specifies two points indicating where a curve is to be erased will be described. However, it should be noted that the present technology can erase a line or curve in any number of locations.

Figure 9A:
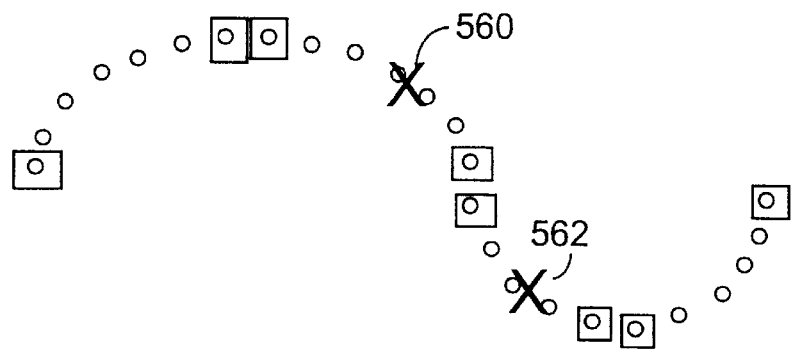
FIGS. 9A–9C are schematic representations of steps used to erase a portion of a shared drawing.
Figure 9B:
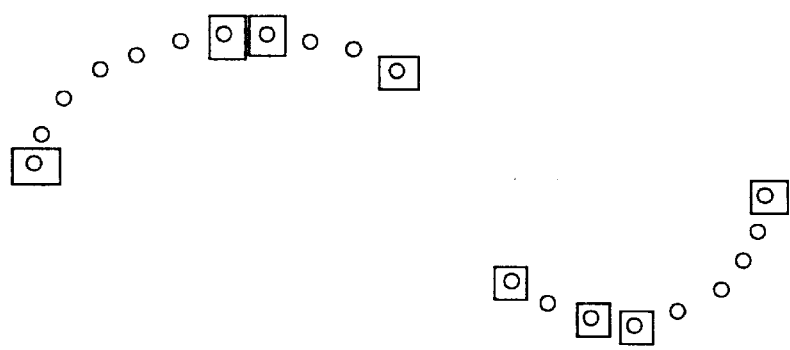
Figure 9C:
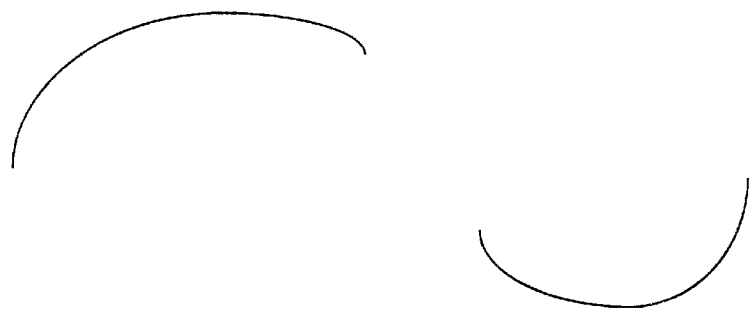
Figure 10:
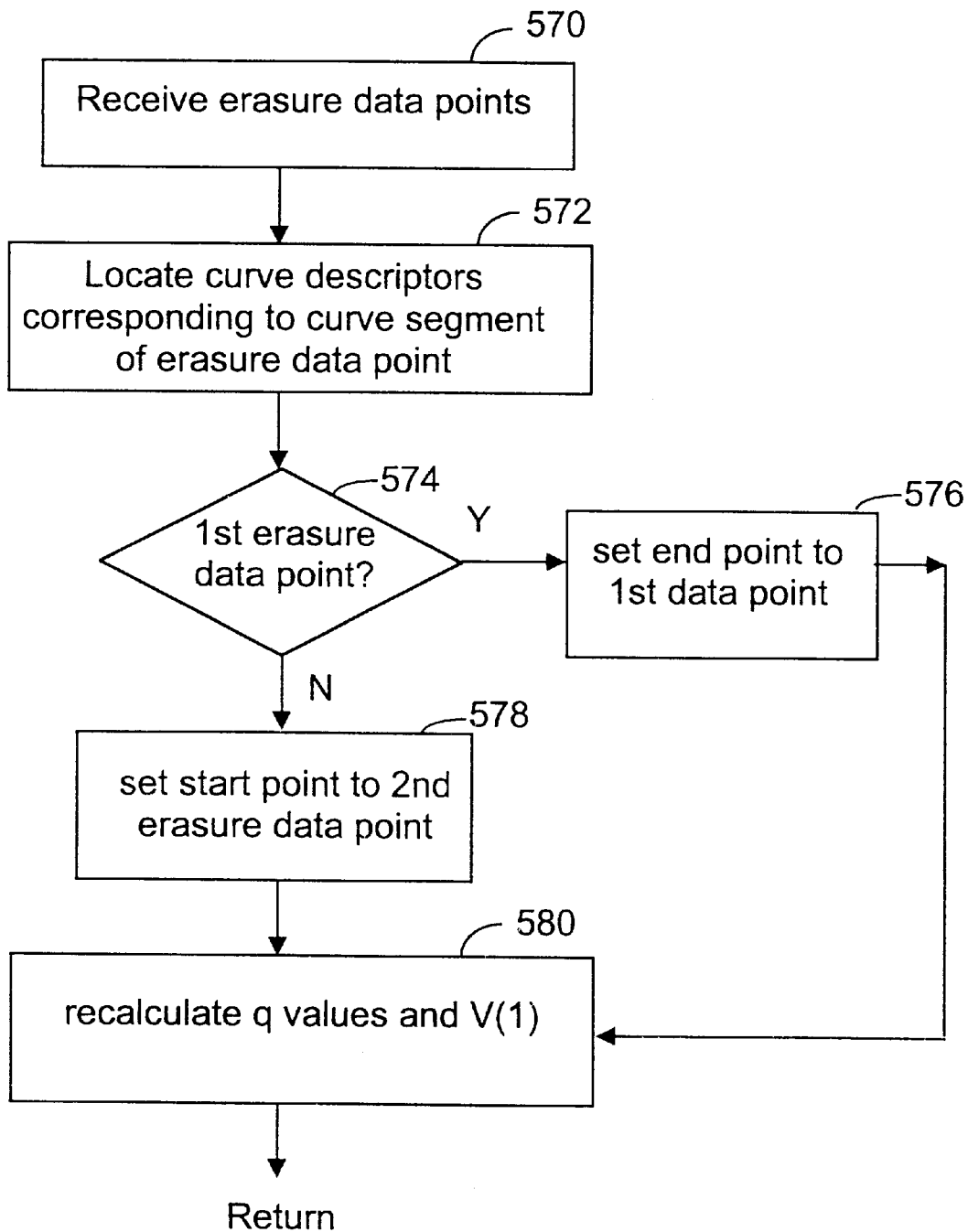
FIG. 10 is a flow chart of the steps used to erase a portion of a shared drawing.

Referring to FIGS. 9–10, a user indicates with the pointing device two points 560, 562 on the curve that define an area of the curve that is to be erased. These points 560, 562 are received by the curve generating procedure 122 (step 570). The curve generating procedure 122 determines the effected curve segments and their associated curve descriptors (step 572). For the curve segment corresponding to the first erasure data point (step 574-Y), the curve segment's end point is adjusted to be first erasure data point. Likewise, for the curve segment corresponding to the second erasure data point (step 574-N), the curve segment's starting point is adjusted to be the second erasure data point (step 578). The appropriate curve data points $q_1(u), q_2(u), q_3(u)$ representing the affected curve segments are recalculated as well as the V(1) curve descriptors in accordance with the aforementioned equations (step 580) (see FIG. 9B). Also, any curve segments located entirely between the deletion points 560, 562 are deleted (step 580).

The curve data points are then transmitted to the image generation procedure 124 to display the new image (see FIG. 9C). The curve descriptors for both of the newly generated curves are transmitted to the server computer 104 for broadcast to each collaborator.

Parallel Curves

Another facility of the present technology is the capability to automatically generate parallel lines or curves from a user's stroke. For illustration purposes, the following discussion will focus on the generation of two parallel curves. However, one skilled in the art can easily modify the described technique to generate parallel lines and multiple parallel lines and curves.

Figure 11A:
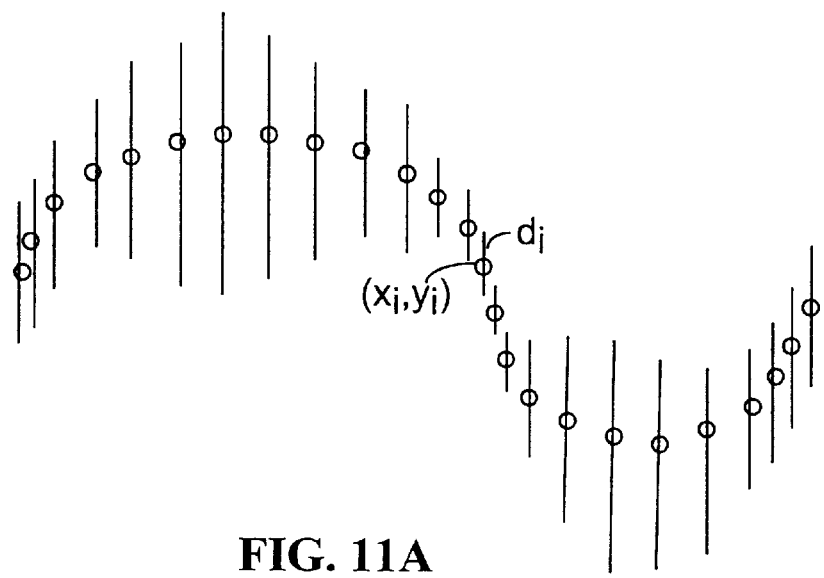
FIGS. 11A–11C are illustrations of curves used to generate a set of parallel lines.
Figure 11B:
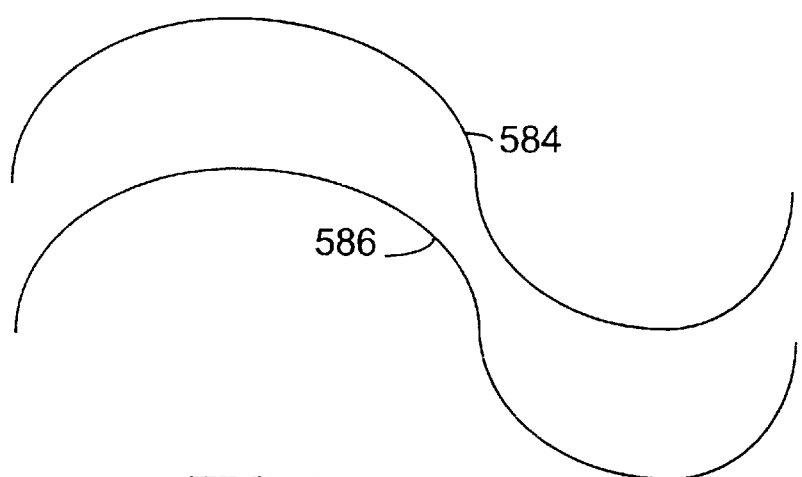

A user traces the path of a curve with a pointing device. The curve is represented as a series of position data points. Each of the two parallel curves will be generated at an equal distance above and below the user's stroke. Time and/or pressure data points associated with the drawn curve are used to determine the distance between the parallel curves (see FIG. 11A). In an alternate embodiment, the time data points need not be received from the pointing device. The time data points can be inferentially calculated by measuring the distance between two position data points as previously described above. In addition, the time and/or pressure data points can also be used to affect the width, texture, and color hue of each of the parallel curves as previously described above.

Figure 12:
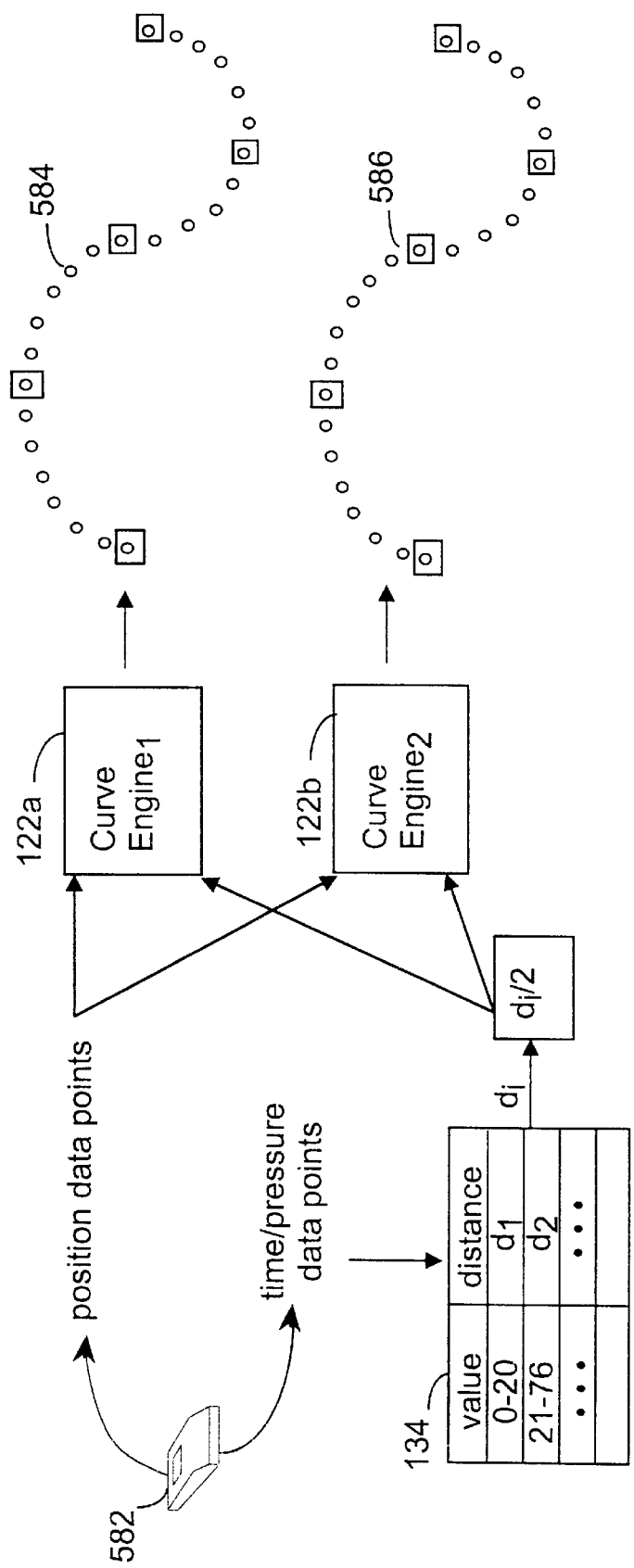
FIG. 12 illustrates the steps used to generate a set of parallel lines.

Referring to FIG. 12, a set of position data points $(x_i, y_i)$ and time and/or pressure data points are received from an I/O device 582. The time and/or pressure data points are mapped via a distance mapping procedure 134 into an appropriate distance measure $d_i$. The distance is divided in half. The distance $(d_i/2)$ and the position data points are transmitted simultaneously to two curve engines 122. The first curve engine 122a generates the curve points and curve descriptors for the top parallel curve and the second curve engine 122b generates the curve points and curve descriptors for the bottom parallel curve. The curve points for both curves are then transmitted to the image generation procedure 124 which displays the parallel curves 584, 586 as shown in FIG. 12B. The curve descriptors are transmitted to the server computer 104 for broadcast to the other collaborators.

Figure 11C:
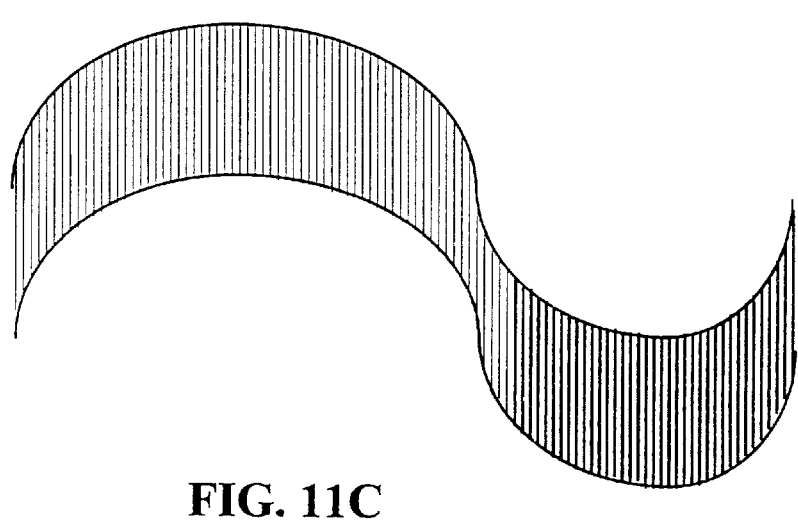

In an alternate embodiment, a user's stroke can be mapped into an image including two parallel curves where the area between the parallel curves includes a user-defined texture as shown in FIG. 11C. The above mentioned steps for generating parallel curves is used to generate two parallel curves. Next, a user-defined texture is drawn in the area between the curves. This texture can also be affected by the time and pressure data points associated with the user drawn stroke. Curve descriptors are computed for this set of parallel curves and are transmitted along with the texture data to the server computer 104 for broadcast to the other collaborators.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIG. 1. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

The present technology has been described with reference to curves and lines. However, the present technology is amenable to any two-dimensional graphic image. Furthermore, one skilled in the art can modify the above discussed technology to accommodate any n-dimensional graphic image.

What is claimed is:

1. A method for generating a drawing in a distributed computing system including at least two client computers and at least one server computer, the method comprising the steps of:

(a) providing one or more drawing tools for use by users associated with the client computers to draw a curve, each drawing tool having one or more style attributes associated therewith;

(b) at a first one of the client computers, receiving a plurality of location data points representing a path of a curve drawn with one of the drawing tools;

(c) at the first client computer, mapping the location data points into a plurality of location curve data points, the location curve data points used to display the curve in accordance with a specified image resolution;

(d) utilizing the location curve data points to display the curve in accordance with the drawing tool used to draw the curve;

(e) at the first client computer, generating one or more sets of location curve descriptors, the location curve descriptors representing a compact representation of the location curve data points; and (f) transmitting the location curve descriptors from the first client computer to the server computer for retransmission to at least a second one of the client computers;

(g) at the second client computer, converting the location curve descriptors into a plurality of location curve data points, the location curve data points used to display the curve in accordance with a specified resolution and in accordance with a specified drawing tool;

wherein each step performed at the first client computer is also performed at the second client computer and each step performed at the second client computer is also performed at the first client computer so as to enable the users at the first and second client computers to cooperatively generate the drawing.

2. A method for generating a curve in a distributed computing system including at least one client computer and at least one server computer, the method comprising the steps of:

(a) providing one or more drawing tools for use by users associated with the client computers to draw a curve, each drawing tool having one or more style attributes associated therewith;

(b) receiving a plurality of location data points representing a path of a curve drawn with one of the drawing tools;

(c) mapping the location data points into a plurality of location curve data points, the location curve data points used to display the curve in accordance with a specified image resolution; and (d) utilizing the location curve data points to display the curve in accordance with the style attributes of the drawing tool used to draw the curve;

step (b) further including:
receiving a plurality of temporal data points representing a speed at which portions of the curve was drawn;

step (c) further including:
mapping the temporal data points into a plurality of temporal curve points, each of the temporal curve points associated with a corresponding curve data point; and step (d) further including:
utilizing the temporal data points to display the curve in accordance with the drawing tool used to draw the curve.

3. The method of claim 2, wherein the temporal data points are calculated from a distance between consecutive location data points.

4. A method for generating a curve in a distributed computing system including at least one client computer and at least one server computer, the method comprising the steps of:

(a) providing one or more drawing tools for use by users associated with the client computers to draw a curve, each drawing tool having one or more style attributes associated therewith;

(b) receiving a plurality of location data points representing a path of a curve drawn with one of the drawing tools;

(c) mapping the location data points into a plurality of location curve data points, the location curve data points used to display the curve in accordance with a specified image resolution; and (d) utilizing the location curve data points to display the curve in accordance with the drawing tool used to draw the curve;

step (b) further including:
receiving a plurality of pressure data points representing a pressure at which portions of the curve was drawn;

step (c) further including:
mapping the pressure data points into a plurality of pressure curve points, each pressure curve point associated with a corresponding curve data point; and step (d) further including:
utilizing the pressure data points to display the curve in accordance with the drawing tool used to draw the curve.

5. The method of claim 1,
the style attributes including width attributes and color attributes.

6. The method of claim 2,
generating one or more sets of temporal curve descriptors, the temporal curve descriptors representing a compact representation of the temporal curve data points; and
transmitting the temporal curve descriptors to the server computer for broadcast to one or more of the client computers.

7. The method of claim 6,
for each of the receiving client computers, converting the temporal curve descriptors into a plurality of temporal curve data points, the temporal curve data points used to display the curve in accordance with a specified resolution and in accordance with a specified drawing tool.

8. The method of claim 4,
generating one or more sets of pressure curve descriptors, the pressure curve descriptors representing a compact representation of the pressure curve data points; and
transmitting the pressure curve descriptors to the server computer for broadcast to one or more of the client computers.

9. The method of claim 8,
for each of the receiving client computers, converting the pressure curve descriptors into a plurality of pressure curve data points, the pressure curve data points used to display the curve in accordance with a specified resolution and in accordance with a specified drawing tool.

10. An interactive drawing apparatus, comprising:
one or more client computers, each said client computer including:
a memory for storing a graphical drawing;
an input mechanism for receiving one or more hand-drawn shapes applied to said graphical drawing;
at least one curve engine for partitioning each said hand-drawn shape into a plurality of adjacent curves, each said adjacent curve having at least one boundary, each said boundary determined based on changes in direction of said hand-drawn shape meeting predefined threshold criteria, said curve engine representing each said adjacent curve as a set of control points defining said curve; and
at least one server computer, coupled by one or more communication links to the client computers, the at least one server computer including a communication mechanism for receiving said control points and transmitting said control points to one or more of said client computers.

11. The apparatus of claim 10,
said curve engine generating a set of location curve points associated with said control points, said set of location curve points used to display said hand-drawn shape in accordance with a predetermined criteria;
each said client computer including:
an output device for displaying said graphical drawing; and
an image generation procedure that receives said location curve points and displays said associated hand-drawn shape in accordance with said location curve points as part of said graphical drawing on said output device.

12. The apparatus of claim 10,
each said client computer including:
a conferencing procedure for managing an exchange of communications between one or more of said client computers.

13. The apparatus of claim 10, each said client computer including:
  a conversion procedure that imports a received drawing associated with a first format into said drawing associated with a second format.

14. The apparatus of claim 10, each said client computer including:
  a session transcript procedure that records alterations made to said drawing by each of said client computers.

15. A computer program product for use in conjunction with a computer system, the computer program product comprising a computer readable storage medium and a computer program mechanism embedded therein, the computer program mechanism comprising:

a graphical drawing;

an input mechanism for receiving one or more hand-drawn shapes applied to said graphical drawing;

at least one curve engine for partitioning each said hand-drawn shape into a plurality of adjacent curves, each said adjacent curve having at least one boundary, each said boundary determined based on changes in direction of said hand-drawn shape meeting predefined threshold criteria, said curve engine representing each said adjacent curve as a set of control points defining said curve; and a broadcast mechanism for transmitting said control points to one or more of said client computers.

16. The computer program product of claim 15, said curve engine generating a set of location curve points associated with said control points, said set of location curve points used to display said hand-drawn shape in accordance with a predetermined criteria;

an output device for displaying said graphical drawing; and an image generation procedure that applies said location curve points to said graphical drawing on said output device.

17. The computer program product of claim 15, a conferencing procedure for managing an exchange of communications between one or more of said client computers.

18. The computer program product of claim 15, a conversion procedure that converts a received drawing associated with a first format into a second format associated with said graphical drawing.

19. The computer program product of claim 15, a session transcript procedure that records alterations made to said graphical drawing by each of said client computers.

20. A computer-implemented method for generating and displaying a curved image, said method comprising the steps of:

(a) receiving a hand-drawn shape of a curved image;
  (b) obtaining a distance measurement d from said hand-drawn shape;
  (c) providing a set of parallel curved images, each of said parallel curved images represented as a plurality of adjacent curves, each said adjacent curve having at least one boundary, each said boundary determined based on changes in direction of said hand-drawn shape meeting a predefined threshold, a first one of said parallel curved images located at a distance d/2 above said shape and a second one of said parallel curved images located at a distance d/2 below said shape; and
  (d) displaying each of said parallel curved images.

21. The method of claim 20, wherein said hand-drawn shape is received as a plurality of position data points;

said step (b) further comprising the steps of:
  (i) obtaining a plurality of temporal data points, each said temporal data point associated with a respective one of said position data points; and
  (ii) mapping each of said temporal data points into a corresponding distance data point, said distance data point including a specified location for positioning an associated position data point;

said step (c) further comprising the step of:
  (i) utilizing said position data points and said distance data points to generate said set of parallel curved images.

22. The method of claim 21, said step (b)(i) further comprising the step of:
  computing a temporal data point for each of said position data points, each said temporal data point representing a distance between a current position data point and an immediately preceding position data point.

23. The method of claim 20, wherein said hand-drawn shape is received as a plurality of position data points;

said step (b) further comprising the steps of:
  (i) receiving a plurality of pressure data points, each said pressure data point associated with a respective one of said position data points; and
  (ii) mapping each of said pressure data points into a corresponding distance data point, said distance data point including a specified location for positioning an associated position data point; and said step (c) further comprising the step of:
  (i) utilizing said position data points and said distance data points to generate said set of parallel curved images.

24. An apparatus for creating a drawing, comprising:

one or more drawing tools for use by users of a client computer to draw a curve, each drawing tool having one or more style attributes associated therewith;

an input device for receiving a plurality of location data points representing a path of a curve drawn with one of the drawing tools;

a curve engine, coupled to the input device, for mapping the location data points into a plurality of location curve data points, the location curve data points used to display the curve in accordance with a specified image resolution;

a display device for displaying said freehand sketched input in accordance with the style attributes;

an image generation mechanism, coupled to the curve engine and display device, for mapping the location data points into an image of a curve in accordance with the drawing tool used to draw the curve;

the curve engine generating one or more sets of location curve descriptors, the location curve descriptors representing a compact representation of the location curve data points; and a communication device for transmitting the location curve descriptors from the client computer to a server computer for retransmission to at least a second client computer, and for receiving location curve descriptors from the second client computer via the server computer;

the image generation mechanism including a mechanism for converting the location curve descriptors received via communication device into a plurality of location curve data points, and using the location curve data points to display the curve in accordance with a specified resolution and in accordance with a specified one of the drawing tools.

25. An apparatus for creating a drawing, comprising:

one or more drawing tools for use by users of a client computer to draw a curve, each drawing tool having one or more style attributes associated therewith;

an input device for receiving a freehand sketched input, the freehand sketched input including a plurality of location data points representing a path of a curve drawn with one of the drawing tools;

a curve engine, coupled to the input device, for mapping the location data points into a plurality of location curve data points, the location curve data points used to display the curve in accordance with a specified image resolution;

a display device for displaying said freehand sketched input in accordance with the style attributes;

an image generation mechanism, coupled to the curve engine and display device, for mapping the location data points into an image of a curve in accordance with the drawing tool used to draw the curve;

the curve engine generating one or more sets of location curve descriptors, the location curve descriptors representing a compact representation of the location curve data points;

wherein the received freehand sketched input includes a plurality of temporal data points representing a speed at which portions of the curve was drawn;

the curve engine maps the temporal data points into a plurality of temporal curve points, each of the temporal curve points associated with a corresponding first location curve data point; and the image generating mechanism utilizes the temporal data points to display the curve in accordance with the drawing tool used to draw the curve.

26. The apparatus of claim 25, wherein the temporal data points are calculated from a distance between consecutive location data points.

27. An apparatus for creating a drawing, comprising:

one or more drawing tools for use by users of a client computer to draw a curve, each drawing tool having one or more style attributes associated therewith;

an input device for receiving a freehand sketched input, the freehand sketched input including a plurality of location data points representing a path of a curve drawn with one of the drawing tools;

a curve engine, coupled to the input device, for mapping the location data points into a plurality of location curve data points, the location curve data points used to display the curve in accordance with a specified image resolution;

a display device for displaying said freehand sketched input in accordance with the style attributes;

an image generation mechanism, coupled to the curve engine and display device, for mapping the location data points into an image of a curve in accordance with the drawing tool used to draw the curve;

the curve engine generating one or more sets of location curve descriptors, the location curve descriptors representing a compact representation of the location curve data points;

wherein the received freehand sketched input includes a plurality of pressure data points representing a pressure at which portions of the curve was drawn;

the curve engine maps the pressure data points into a plurality of pressure curve points, each pressure curve point associated with a corresponding curve data point; and the image generating mechanism utilizes the pressure data points to display the curve in accordance with the drawing tool used to draw the curve.

* * * * *